United States Patent [19]

Garbes et al.

[11] Patent Number: 5,570,826
[45] Date of Patent: Nov. 5, 1996

[54] HITCH SOCKET MOUNTED COLLISION GUARD AND UTILITY PLATFORM

[76] Inventors: Larry V. Garbes; Anita Garbes, both of 32864 190th St., Clarksville, Iowa 50619

[21] Appl. No.: 488,928
[22] Filed: Jun. 9, 1995
[51] Int. Cl.$^6$ ............................................. B60R 9/00
[52] U.S. Cl. ............................ 224/524; 224/523; 224/518; 224/519
[58] Field of Search .......................... 224/524, 523, 224/518, 519, 521, 525, 526, 528, 529, 530

[56] References Cited

U.S. PATENT DOCUMENTS

| | | |
|---|---|---|
| 3,887,223 | 6/1975 | Bez . |
| 3,934,912 | 1/1976 | Ogihara et al. . |
| 4,008,915 | 2/1977 | Walker . |
| 4,658,941 | 4/1987 | Gottwald et al. . |
| 4,813,584 | 3/1989 | Wiley . |
| 4,856,686 | 8/1989 | Workentine ........................... 224/521 |
| 4,938,399 | 7/1990 | Hull et al. ............................. 224/526 |
| 5,038,983 | 8/1991 | Tomososki ........................... 224/528 |
| 5,096,102 | 3/1992 | Tolson ................................... 224/523 |
| 5,100,189 | 3/1992 | Futamata et al. . |
| 5,257,842 | 11/1993 | Sherno . |
| 5,310,100 | 5/1994 | Liscinsky . |
| 5,358,157 | 10/1994 | Abretske . |
| 5,460,304 | 10/1995 | Porter et al. ........................... 224/521 |

Primary Examiner—David J. Walczak
Attorney, Agent, or Firm—Simmons, Perrine, Albright & Ellwood, PLC

[57] ABSTRACT

A vehicle hitch socket mounted vehicle accessory assembly is provided with an integral accessory hitch socket to receive a hitch plug of another such vehicle accessory or a towing hitch member. The vehicle accessory assembly includes a hitch extender structure with an accessory hitch plug at a front end and an accessory hitch socket at a rear end. A vehicle accessory is mounted on the hitch extender structure. Such vehicle accessories include a rear collision guard assembly and a utility platform assembly. The collision guard assembly includes a rectangular guard frame extending upwardly from the hitch extender and positioned rearward of the vehicle bumper to protect door mounted equipment from damaging the doors upon a low speed collision with an external structure. The utility platform assembly includes a horizontally oriented platform frame for carrying luggage or the like external to a vehicle. The collision guard and the utility platform assemblies can be installed individually on a vehicle or in combination. If desired, the hitch extender may include an elevator portion that provides greater clearance.

16 Claims, 2 Drawing Sheets

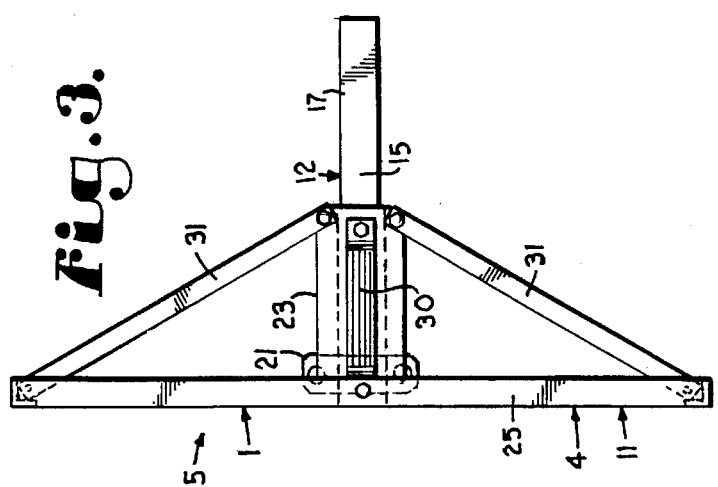
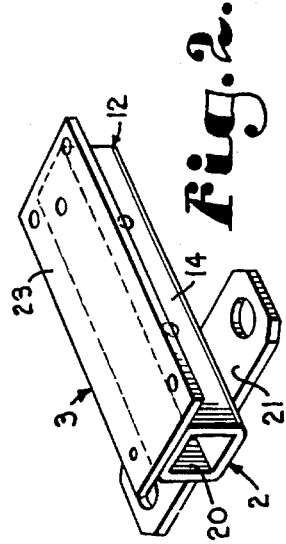
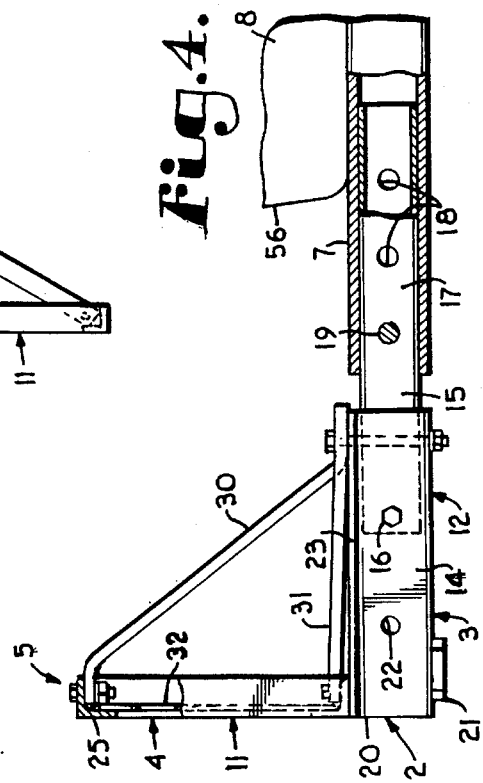
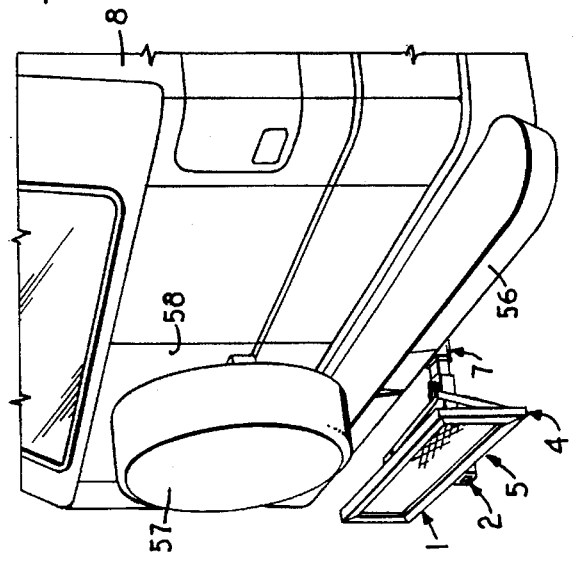
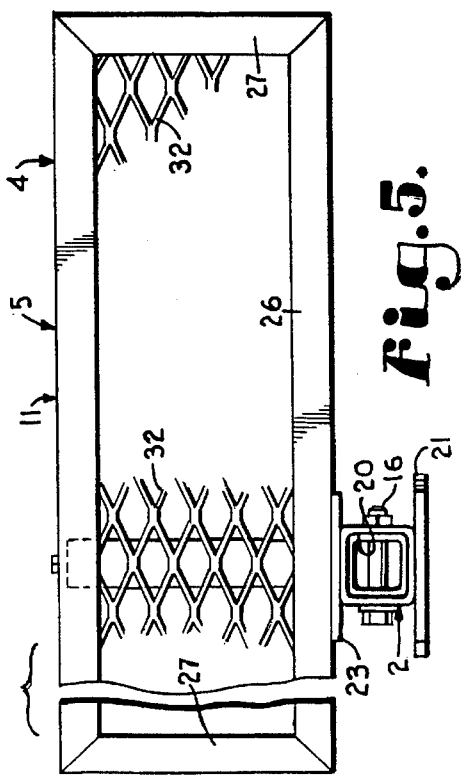

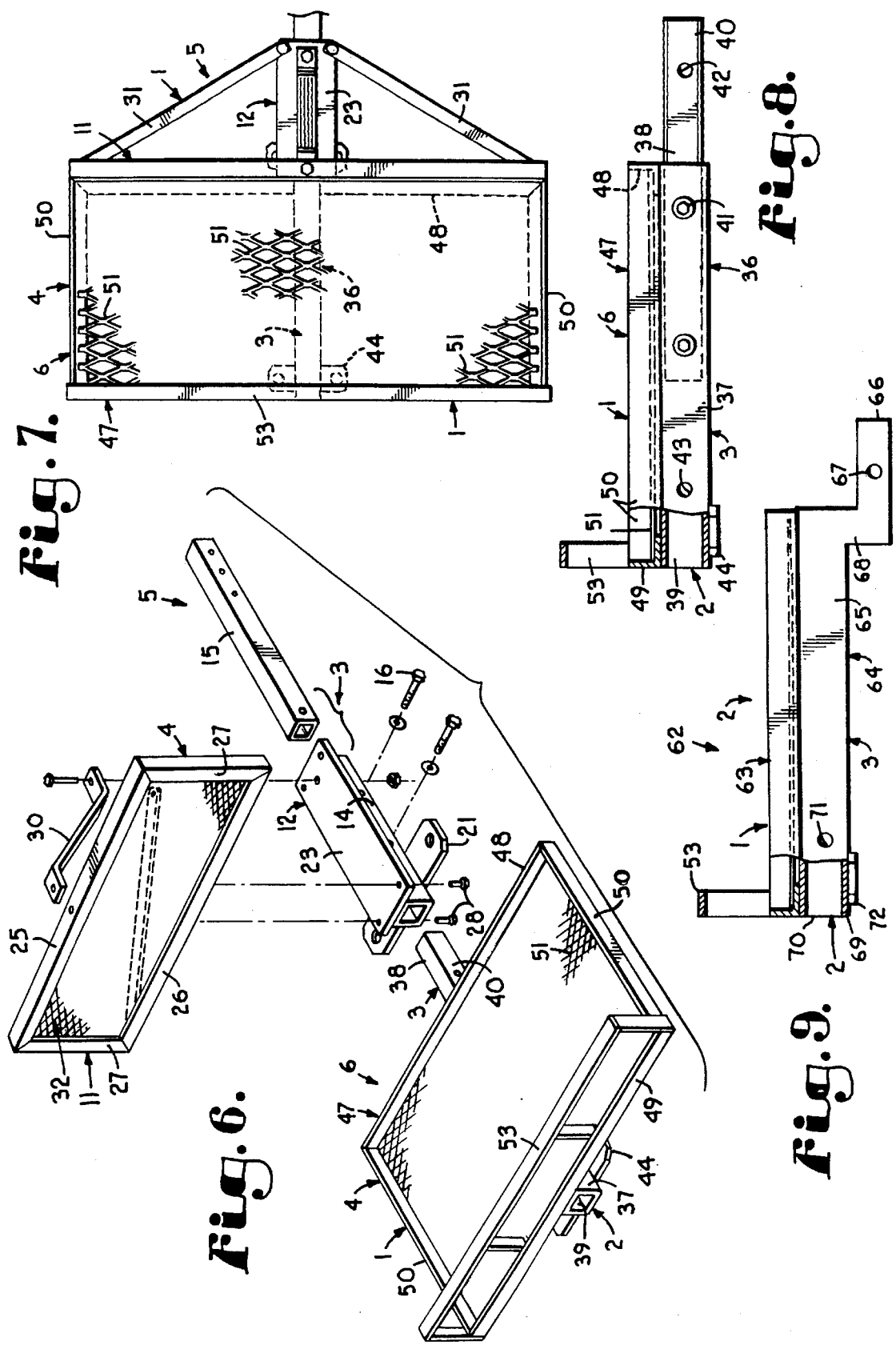

HITCH SOCKET MOUNTED COLLISION GUARD AND UTILITY PLATFORM

BACKGROUND OF THE INVENTION

Certain types of vans, sport-utility vehicles, and recreation vehicles have spare tires, ladders, and other accessories mounted on the rear door of such a vehicle. A collision, even at low speeds, of the rear of the vehicle with a tree, post, or the like can result in damage to a rear door to the extent that the door can no longer be opened or retained closed. Such damage can be particularly inconvenient when the driver is far from home and may render the vehicle vulnerable to theft of possessions carried in the vehicle. In addition, costs to repair such doors can be quite expensive.

Such vehicles are often equipped with trailer hitches for pulling boats on trailers, camping trailers, so-called travel trailers, and other kinds of trailers. Ball type hitches are universally favored since they enable universal pivoting of the trailer frame with respect to the towing vehicle frame. Ball hitches are available in a number of configurations, including those which are mounted on bumpers and others which are connected to the towing vehicle frame.

A ball hitch, which is becoming increasingly popular, is formed by a mounting frame with a rearwardly extending hitch socket. The mounting frame is secured to the vehicle frame by welding or bolts, or a combination of the two. The hitch socket is formed by a square cross section tubular member sized to telescopically receive a hitch member formed by a smaller square cross section tube which has a hitch ball mounted thereon. The hitch member is removably secured to the hitch socket by a bolt or pin. The rear end of the hitch socket is usually recessed forward of the plane of the rear bumper, while the installed hitch member extends rearward beyond the rear bumper. The hitch member can form a hazard which can trip or otherwise injure persons moving near the rear bumper For this reason, the hitch member is usually removed when not needed to avoid such a hazard and also to enhance the appearance of the vehicle.

SUMMARY OF THE INVENTION

The present invention utilizes such a hitch socket to provide hitch socket mounted vehicle accessories having their own hitch sockets and, more particularly, to provide a mount for a rearwardly extending collision guard and a utility platform. The collision guard is generally formed by a rectangular guard frame mounted in a transverse vertical plane on a short hitch socket extender. The utility platform is formed in a similar manner by a rectangular platform frame mounted in a horizontal plane on a long hitch socket extender. The short hitch extender and the long hitch extender are formed by square tubes similar to the vehicle hitch socket, and each has a respective smaller tube or hitch plug secured therein for reception in the vehicle hitch socket. A modified embodiment of the long hitch extender is formed by a single square tube of a dimension for insertion into a vehicle hitch socket. An accessory hitch socket of such a modified long hitch extender is sized to receive a smaller hitch member or a smaller hitch plug of a vehicle accessory according to the present invention.

The guard frame is formed by angle stock members joined to define a rectangle with the enclosed area covered by a steel mesh. The guard frame is attached by bolts to an upper plate welded on top of the short hitch extender tube. A Z-shaped upstanding brace is fastened between the top member of the guard frame and a front end of the upper plate. Lateral braces extend between the ends of the lower member of the guard frame and the front end of the upper plate. A safety chain bracket is welded to the lower side of the short hitch extender tube.

The platform frame is formed of angle members with steel mesh covering the enclosed area. The platform frame may have the same width as the guard frame, but is preferably deeper than the height of the guard frame. The platform frame is secured to the top face of the long hitch extender tube, as by welding, although a top plate and bolts could alternatively be employed. A short barrier or fence extends upward from the rear end of the platform frame to retain an article on the utility platform, such as a "cooler", luggage, or the like. The barrier may also be used for tie-down purposes. A safety chain bracket is welded to the lower side of the rear end of the long hitch extender tube.

The collision guard and the utility platform may be used individually or in combination. The collision guard extends rearward for a sufficient distance to prevent, or reduce the probability of, a low speed collision engaging a spare tire, jerry can, or other equipment mounted on a rear door with an external structure. When both the collision guard and the utility platform are installed, the hitch plug of the collision guard assembly is inserted into the vehicle hitch socket and secured by a bolt or pin. The hitch plug of the utility platform assembly is then inserted into the hitch socket tube of the collision guard assembly and secured thereto by a bolt or pin. A conventional square tube hitch member may then be inserted into the hitch socket tube of the utility platform assembly for towing a relatively light weight trailer, such as a camping trailer, a boat trailer, or the like.

OBJECTS AND ADVANTAGES OF THE INVENTION

The principal objects of the present invention are: to provide a hitch socket mounted vehicle accessory assembly having its own hitch socket which is adapted to receive a second such assembly or a hitch member therein; to provide such an assembly including a hitch extender structure formed by a rear opening hitch socket member with a hitch plug member extending forwardly therefrom; to provide such an assembly having a vehicle accessory mounted on the hitch extender structure: to provide such an assembly in which the vehicle accessory is a rear collision guard formed by a collision guard frame mounted on a short hitch extender structure for orientation in a transverse vertical plane; to provide such a rear collision guard assembly which protects the rear of a vehicle from damage caused by a low speed collision with a fixed structure; to provide a second such assembly in which the vehicle accessory is a utility platform formed by an enclosed utility platform frame mounted on a long hitch extender structure for orientation in a horizontal plane; to provide such a utility platform for carrying a cooler, luggage, or similar equipment thereon; to provide such assemblies which may be installed individually or in combination and which provide for the installation of a standard vehicle hitch member in the open accessory hitch socket thereof; and to provide such a hitch socket mounted collision guard and utility platform which are economical to manufacture, which are rugged and convenient in use, and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a hitch mounted rear collision guard embodying the present invention, illustrated mounted in a hitch socket of a vehicle.

FIG. 2 is an enlarged perspective view of a short hitch socket extender which forms a main structural body of the collision guard of the present invention.

FIG. 3 is a top plan view at a reduced scale of the collision guard of the present invention.

FIG. 4 is an enlarged side elevational view of the collision guard shown installed in a hitch socket of a vehicle.

FIG. 5 is a fragmentary rear elevational view of the collision guard of the present invention.

FIG. 6 is an exploded perspective view at a reduced scale of the collision guard along with a utility platform according to the present invention.

FIG. 7 is a top plan view of the interconnected collision guard and the utility platform of the present invention.

FIG. 8 is an enlarged side elevational view of the utility platform with portions broken away to illustrate structural details.

FIG. 9 is an enlarged side elevational view of an alternative embodiment of the utility platform according to the present invention, which incorporates a modified hitch extender and elevator structure.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a hitch socket mounted vehicle accessory assembly having an accessory hitch socket 2 and embodying the present invention. The assembly 1 generally includes a hitch extender structure 3 on which is mounted a vehicle accessory 4. The assembly 1 is embodied in the present invention as a rear collision guard assembly 5 (FIGS. 1 and 3–7) and a utility platform assembly, 6 (FIGS. 6–8). In general, the assemblies 5 and 6 are installed individually or in combination in a vehicle hitch socket 7 of a vehicle 8 (FIG. 1).

The collision guard assembly 5 includes a collision guard frame 11 mounted on a short hitch extender structure 12. Referring to FIGS. 2 and 4, the short hitch extender 12 is formed by an outer tube 14 and an inner tube 15, both of square cross section. The outer tube 14 is preferably a standard two-inch square steel tube. The inner tube 15 is telescoped within the outer tube 14 and secured therein, as by one or more bolts 16. The portion of the inner tube 15 which extends from a front end of the outer tube 14 forms a guard assembly hitch plug 17 for reception in the vehicle hitch socket 7. The hitch plug 17 is provided with one or more laterally aligned hole sets 18 to receive a bolt or pin 19 to releasably secure the short hitch extender 12 within the vehicle hitch socket 7.

A rear end of the outer tube 14 forms a guard assembly hitch socket 20 for installation of the platform assembly 6 or a conventional vehicle hitch member (not shown) having a hitch ball thereon. The illustrated short hitch extender 12 has a safety chain bracket 21 welded to a lower face of the outer tube 14. A set of laterally aligned holes 22 are formed through the outer tube 14 to receive a bolt or pin (not shown) to secure the platform assembly 6 or a vehicle hitch member within the guard hitch socket 20. A mounting plate 23 is welded to a top/:ace of the outer tube 14 and completes the short hitch extender structure 12.

The illustrated collision guard frame 11 is formed by upper and lower frame members 25 and 26 and side members 27 (FIG. 5) which are mitered at their ends and joined to form the rectangular collision guard frame 11. The frame members 25–27 may be angle stock, as illustrated, or other cross-sectional material. The frame 11 is attached to the short hitch extender 12, as by bolts 28 (FIG. 6) passing through a front end of the lo mounting plate 23 and the lower frame member 26. A Z-shaped center brace 30 is connected between a center of the upper frame member 25 and a front end of the mounting plate 23. A pair of lateral braces 31 are connected respectively between the outer ends of the lower frame member 26 and the front end of the mounting plate 23.

The area enclosed by the frame members 25–27 may be covered by sheet metal or, as illustrated, by a metal mesh 32.

Referring to FIGS. 6–8, the utility platform assembly 6 is constructed on a long hitch extender structure 36 formed by an outer square tube 37 with an inner square tube 38 telescoped therein. The outer tube 37 forms a platform hitch socket 39 at a rear end which is substantially similar to the vehicle hitch socket 7 and the guard hitch socket 20. A forwardly extending portion of the inner tube 38 forms a platform hitch plug 40 sized for reception in either the guard hitch socket 20 or the vehicle socket 7.

The inner tube 38 is secured within the outer tube 37, as by bolts 41, which extend through the outer and inner tubes 37 and 38. The hitch plug 40 of the inner tube 38 has a set of laterally aligned holes 42 formed therethrough for alignment with the holes 22 of the guard hitch socket 20 or similar holes in the vehicle hitch socket 7 for securing therein by a bolt (not shown). Laterally aligned securing holes 43 are formed through the outer tube 37 to secure another accessory assembly 1 or a vehicle hitch member therein. A safety chain bracket 44 is welded to a lower face of the outer tube 37.

The utility platform assembly 6 includes a platform frame 47 formed by front and rear frame members 48 and 49 and side frame members 50, all formed of angle stock. The frame members 48–50 are mitered at their ends and joined, as by welding, to form a rectangular shape. The area enclosed by the frame members 48–50 may be covered with sheet metal or metal mesh 51. An upstanding barrier or fence 53 extends along the rear frame member 49 to prevent equipment carried on the platform 6 from sliding rearwardly off the platform 6. The fence 53 can also be used for tying or strapping such equipment onto the platform 6.

The platform frame 47 is mounted on the long hitch extender 36, as by welding the front and rear frame members 48 and 49 to the outer tube 37. Although not shown, the long hitch extender 36 could incorporate a mounting plate similar to the mounting plate 23 of the short hitch extender structure 12.

The collision guard 5 and the utility platform 6 of the present invention can be used individually or in combination. The collision guard 5 extends rearward beyond a bumper 56 of the vehicle 8 to prevent, during a low speed rear collision of the vehicle 8, a fixed structure from engaging equipment, such as a spare tire 57 (FIG. 1) mounted on a rear door 58, and possibly damaging the door 58. Further, the extent that the upper frame member 25 is spaced above the vehicle hitch socket 7 is limited such that the rear door 58 can be opened thereover.

The utility platform 6 provides additional carrying space for luggage, a cooler, or the like. The platform 6 can also be used for other purposes, such as for holding a camp stove, for seating, or the like. When the guard 5 and the platform 6 are used in combination, the guard 5 is normally installed in the vehicle hitch socket 7, and the platform 6 is installed in the guard hitch socket 20.

FIG. 9 illustrates an alternative embodiment 62 of a utility platform assembly according to the present invention. The platform 62 includes a platform frame 63 mounted on a modified hitch extender and elevator 64. The platform frame 63 may be substantially similar to the utility platform frame 47. The hitch extender 64 differs from the hitch extender 36 in being formed of a square tube 65 sized to be received in the guard hitch socket 20 or the vehicle hitch socket 7. A front end of the tube 65 forms a hitch plug 66 and has a lateral set of securing holes 67. In addition, the hitch extender 64 includes an elevator portion 68 adapted to elevate a rear end 69 to minimize the tendency to drag as the vehicle 8 using the invention navigates a dip or other surface irregularity. For example, the elevator portion 68 may elevate the rear end 69, by a "gooseneck" type of arrangement as shown in FIG. 9, by approximately three inches.

A rear end of the tube 65 forms a hitch socket 70 and has a lateral set of securing holes 71 formed therein. A safety chain bracket 72 is welded to a lower face of the tube 65 at the rear end thereof. The hitch socket 70 is smaller than the hitch sockets 7, 20, and 39 and is, therefore, adapted to receive a smaller hitch plug (not shown) of another accessory assembly 1 or a smaller towing hitch member (not shown). In other respects, the utility platform assembly 62 is substantially similar to the utility platform assembly 6.

Extra care in driving may be advisable when towing a trailer when both the collision guard assembly 5 and utility platform assembly 6 or 62 are installed, particularly in making turns, because of the increased moment arm between the rearmost accessory hitch socket 2 and the vehicle hitch socket 7. However, the smaller tubes within the larger tubes of the hitch extender 3 and the composite framework of the collision guard 5 and the utility platform 6 or 62 contribute to the stiffness of the overall assembly and thereby compensate to some extent for the increased moment arm of the structure.

While the vehicle accessory assembly 1 has been described and illustrated in the embodiments of a collision guard assembly 5 and utility platform assemblies 6 and 62, other configurations of such accessory assemblies 1 according to the present invention are envisioned. Therefore, it is to be understood that while certain forms of the present invention have been illustrated and described herein, it is not to be limited to the specific forms or arrangement of pans described and shown.

What is claimed and desired to be secured by Letters Patent is as follows:

1. A vehicle accessory assembly for mounting in a standard vehicle hitch socket attached to a vehicle having a rear-opening door and comprising:
   (a) a hitch extender structure including:
      (1) an accessory hitch socket member forming an accessory hitch socket;
      (2) a hitch plug member sized to enable insertion into the vehicle hitch socket and releasable securing therein; and
      (3) said hitch plug member being connected to said accessory hitch socket member;
   (b) a vehicle accessory including a rear collision guard mounted on said hitch extender structure; said rear collision guard including a collision guard frame having an upper frame member wherein said upper frame member is spaced such that a rear-opening door is openable thereover; and
   (c) a Z-shaped brace connected between said upper frame member and said hitch extender structure.

2. An assembly as set forth in claim 1 including a second hitch extender structure, similar to first said hitch extender structure but having a utility platform mounted thereon and adapted to be received by said first hitch extender.

3. An assembly as set forth in claim 2 wherein said second hitch extender structure has a longitudinal axis and wherein said utility platform includes:
   (a) a utility platform frame attached to said second hitch extender structure and oriented parallel to said longitudinal axis of said second hitch extender structure to thereby orient said utility platform frame in a horizontal plane when said second hitch extender structure is inserted into the vehicle hitch socket.

4. An assembly as set forth in claim 3 wherein:
   (a) said utility platform frame has a front edge and an opposite rear edge; and
   (b) a barrier extends perpendicularly from said utility platform frame along said rear edge thereof.

5. An assembly as set forth in claim 1 wherein said vehicle hitch socket is formed by a vehicle square cross section tubular member and wherein said hitch extender structure includes:
   (a) said accessory hitch socket member including an accessory square cross section tubular member similar in cross sectional dimensions to said vehicle hitch socket;
   (b) said hitch plug member is formed by a plug square cross section member having dimensions to enable fitting within said vehicle hitch socket and said accessory hitch socket member; and
   (c) said hitch plug member is positioned within said accessory hitch socket member and is secured therein.

6. An assembly as set forth in claim 1 wherein said hitch extender structure has a longitudinal axis and wherein said collision guard frame is oriented perpendicular to said longitudinal axis to thereby orient said collision guard frame in a transverse vertical plane when said hitch extender structure is inserted into the vehicle hitch socket.

7. A vehicle accessory assembly for mounting in a standard vehicle hitch socket formed by a vehicle square cross section tubular member and attached to a vehicle having a rear-opening door and comprising:
   (a) a hitch extender structure including:
      (1) an accessory hitch socket member forming an accessory hitch socket, said accessory hitch socket member including an accessory square cross section tubular member similar in cross sectional dimensions to the vehicle hitch socket;

(2) a hitch plug member formed by a plug square cross section member having dimensions to enable fitting within the vehicle hitch socket and said accessory hitch socket member; and (3) said hitch plug member is positioned within said accessory hitch socket member and is secured therein;

(b) a vehicle accessory including a rear collision guard mounted on said hitch extender structure; said rear collision guard including a collision guard frame having an upper frame member wherein said upper frame member is spaced such that a rear-opening door can be opened thereover; and (c) an upstanding brace connected between said upper frame member and said hitch extender structure.

8. An assembly as set forth in claim 7 including a second hitch extender structure, similar to first said hitch extender structure but having a utility platform mounted thereon and adapted to be received by said first hitch extender.

9. An assembly as set forth in claim 8 wherein said second hitch extender structure has a longitudinal axis and wherein said utility platform includes:

(a) a utility platform frame attached to said second hitch socket member and oriented parallel to said longitudinal axis of said second hitch extender structure to thereby orient said utility platform frame in a horizontal plane when said second hitch extender structure is inserted into the vehicle hitch socket.

10. An assembly as set forth in claim 9 wherein:

(a) said utility platform frame has a front edge and an opposite rear edge; and (b) a barrier extends perpendicularly from said utility platform frame along said rear edge thereof.

11. An assembly as set forth in claim 7 wherein said hitch extender structure has a longitudinal axis and wherein said collision guard frame is oriented perpendicular to said longitudinal axis to thereby orient said collision guard frame in a transverse vertical plane when said hitch extender structure is inserted into the vehicle hitch socket.

12. A vehicle accessory combination for removable attachment to a vehicle hitch socket of a vehicle having a rear-opening door and comprising:

(a) a first hitch extender structure including:
(1) a first accessory hitch socket member forming a first accessory hitch socket;
(2) a first hitch plug member sized to enable insertion into the vehicle hitch socket member and releasable securing therein; and
(3) said first hitch plug member being connected to said first accessory hitch socket member;

(b) a rear collision guard mounted on said first hitch extender structure; said rear collision guard including a collision guard frame having an upper frame member wherein said upper frame member is spaced such that a rear-opening door is openable thereover;

(c) a second hitch extender structure including:
(1) a second accessory hitch socket member forming a second accessory hitch socket;
(2) a second hitch plug member sized to enable insertion into the vehicle hitch socket of said first accessory hitch socket and releasable securing therein; and
(3) said second hitch plug member being connected to said second accessory hitch socket member;

(d) a utility platform mounted on said second hitch extender structure; and (e) an upstanding brace connected between said upper frame member and said first hitch extender structure.

13. An assembly as set forth in claim 12 wherein said second hitch extender structure has a second longitudinal axis and wherein said utility platform includes:

(a) a utility platform frame attached to said second accessory hitch socket member and oriented parallel to said second longitudinal axis to thereby orient said utility platform frame in a horizontal plane when said second hitch extender structure is inserted into said first accessory hitch socket of said first accessory hitch socket member.

14. An assembly as set forth in claim 13 wherein:

(a) said utility platform frame has a front edge and an opposite rear edge; and (b) a barrier extends perpendicularly from said utility platform frame along said rear edge thereof.

15. An assembly as set forth in claim 12 wherein said first hitch extender structure has a first longitudinal axis and wherein:

(a) said collision guard frame is attached to said first hitch socket member and oriented perpendicular to said first longitudinal axis to thereby orient said collision guard frame in a transverse vertical plane when said first hitch extender structure is inserted into the vehicle hitch socket.

16. An assembly as set forth in claim 12 wherein said second hitch extender structure includes a "gooseneck"-type elevator portion.

\* \* \* \* \*

UNITED STATES PATENT AND TRADEMARK OFFICE
CERTIFICATE OF CORRECTION

PATENT NO. : 5,570,826
DATED : November 5, 1996
INVENTOR(S) : Larry V. Garbes and Anita Garbes It is certified that error appears in the above-indentified patent and that said Letters Patent is hereby corrected as shown below:

In Column 1, line 38, after "bumper", insert --,-- .

In Column 2, line 45: delete ":" and insert therefor --;-- .

In Column 3, line 56: after "assembly", delete "," .

In Column 4, line 15: delete "top/:ace" and insert therefor
--top face-- .

In Column 4, line 24: after "end of the", delete "lo" .

In Column 5, line 63: delete "pans" and insert therefor
--parts-- .

Signed and Sealed this

Fourteenth Day of January, 1997

Attest:

BRUCE LEHMAN

Attesting Officer     Commissioner of Patents and Trademarks